(12) United States Patent
Knauf

(10) Patent No.: US 6,964,080 B2
(45) Date of Patent: Nov. 15, 2005

(54) WIPER ARM FOR A WINDSCREEN WIPER

(75) Inventor: Richard Knauf, Roppenheim (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/450,983

(22) PCT Filed: Jun. 28, 2002

(86) PCT No.: PCT/DE02/02362

§ 371 (c)(1),
(2), (4) Date: Nov. 17, 2003

(87) PCT Pub. No.: WO03/037690

PCT Pub. Date: May 8, 2003

(65) Prior Publication Data

US 2004/0068823 A1    Apr. 15, 2004

(30) Foreign Application Priority Data

Oct. 25, 2001 (DE) ................................ 101 52 841

(51) Int. Cl.⁷ ................................................ B60S 1/34
(52) U.S. Cl. ............................ 15/250.352; 15/250.351
(58) Field of Search ..................... 15/250.351, 250.352, 15/250.31, 250.202, 250.34, 250.19

(56) References Cited

U.S. PATENT DOCUMENTS

| | | | |
|---|---|---|---|
| 4,947,508 A * | 8/1990 | Bauer et al. ............ | 15/250.352 |
| 4,991,251 A * | 2/1991 | Egner-Walter et al. | 15/250.202 |
| 6,394,688 B1 * | 5/2002 | Kraemer ...................... | 403/111 |
| 6,553,608 B2 * | 4/2003 | Kraus et al. ............ | 15/250.352 |
| 6,560,814 B2 * | 5/2003 | Heinrich et al. ....... | 15/250.352 |
| 6,640,381 B1 * | 11/2003 | Zimmer ................ | 15/250.352 |

FOREIGN PATENT DOCUMENTS

| | | |
|---|---|---|
| DE | 37 09 994 A1 | 10/1987 |
| DE | 38 10 017 A1 | 10/1988 |
| DE | 40 28 902 A1 | 3/1992 |
| DE | 42 04 125 A | 9/1992 |
| DE | 42 35 395 A1 | 4/1994 |
| EP | 0 788 951 A | 8/1997 |
| GB | 2253135 * | 9/1992 |
| JP | 60-206755 * | 10/1985 |

\* cited by examiner

*Primary Examiner*—Gary K. Graham
(74) *Attorney, Agent, or Firm*—Michael J. Striker

(57) ABSTRACT

The invention is based on a wiper arm (10) for a windshield wiper, having a fastening part (12) and a joint member (18) that are connected to one another via a swing-down joint (54), and a tension spring (26) is suspended by one end (28) from a suspension device (24) of the joint member (18) and by its other end (30) via a C-shaped bracket (32) in a suspension device (16) of the fastening part (12) and in an operating position presses a wiper blade (34), via a wiper rod (22), against a windshield and in a swing-down position presses a contact face of the joint member (18) or of the C-shaped bracket (32) against a limiting stop of the fastening part (12). It is proposed that between the operating position and the swing-down position, a detent position is provided, up to which the wiper blade (34) can be raised from the windshield in a parking position, without touching a hood over the engine.

5 Claims, 4 Drawing Sheets

WIPER ARM FOR A WINDSCREEN WIPER

BACKGROUND OF THE INVENTION

The invention is based on a wiper arm for a windshield wiper.

Known windshield wipers have a wiper arm that comprises a fastening part and a joint member that has a wiper rod and is pivotably connected to the fastening part. A wiper blade, which as a rule is constructed of a wiper strip holder and a wiper strip, is pivotably connected to the wiper rod.

The joint member, on its end toward the fastening part, has a spring chamber for a tension spring. The spring chamber is open toward the windshield, and toward the wiper rod it has an angle element, such as an eye, from which a retaining bracket of the tension spring is suspended. The other end of the tension spring engages a C-shaped bracket, which is suspended from an angle element of the fastening part. The C-shaped bracket can also be formed onto the tension spring. The joint member is braced via a hub on a joint pin of the fastening part. The joint thus formed, also called a swing-down joint, and the angle element of the tension spring are arranged relative to one another such that the tension spring pulls the joint member and the wiper rod in the direction of a windshield. Thus under the force of the tension spring, the wiper blade rests on the windshield and is limited by it in its operating position.

For cleaning or mounting of the wiper blade, the joint member of the windshield wiper is swung down from the windshield. To that end, the joint member is pivoted about the swing-down joint, and in the range of a swing-down angle of approximately 60 to 80°, the tension of the tension spring must first be overcome. In the swing-down position, the spring no longer pulls the joint member toward the vehicle window; instead, it pulls either a contact face, which is formed onto the joint member, or the C-shaped bracket in the swing-down direction against a limiting stop on the fastening part. To swing the wiper blade back against the windshield, the joint member must be pivoted about the pivot shaft again with a defined force.

To improve the aerodynamic properties of a vehicle, the windshield wipers, in their parking position, are increasingly stored away in a concealed manner in a so-called hood gap between the hood over the engine and the windshield. A wiper system of this kind is known for instance from German Patent Disclosure DE 38 10 017 A1. So that the joint member on being swung down by the usual angle will not strike the hood and damage it, a limiting stop is provided, permitting it to be swung down only within a smaller angular range, in which the tension spring does not yet generate any force in the swing-down direction. In this swing-down position, which does suffice to clean the windshield but makes changing the wiper blade more difficult, the joint member is held by a spring detent that is formed by the tension spring and a cam-shoulder assembly.

Some swing-down joints, for instance in accordance with German Patent Disclosure DE 37 09 994 A1, have a hub that is solidly joined to the fastening part and is open toward the joint member and is engaged by a boltlike pivot shaft that is solidly joined to the joint member. In the built-in state, the joint member with the wiper blade are held in a stable position by the hub and the vehicle window, while in the swing-down position they are held in a stable position by the hub and the limiting stop. Accordingly there is no risk that the joint member will be rotated outward toward the open side of the hub.

In the preassembled state, for instance for shipping, there is the risk that a slight exertion of force on the premounted wiper arm, for instance from jarring during shipping or from careless handling, the pivot shaft will slide out of the hub, and the swing-down joint will fall apart into its individual components. This necessitates additional installation work and has the risk the parts will be lost.

SUMMARY OF THE INVENTION

According to the invention, between the operating position and the swing-down position, a detent position is provided, up to which the wiper blade can be raised from the windshield in a parking position, without touching an engine hood. For installing a wiper blade, the windshield wiper is moved out of the parking position into a mounting position, in which without damaging the hood the detent position can be bridged, and the joint member reaches the swing-down position with a swing-down angle in which the wiper blade can easily be installed. In the parking position, the joint member is fixed in an intermediate position that precludes damage to the hood but at the same time offers sufficient free space for cleaning the wiper blade or the windshield. This position is advantageously embodied as a detent position, so that the wiper arm can be securely kept in this position, in which it does not unintentionally strike the hood or fall back against the windshield again without the wiper blade being in place.

To make the detent position of the windshield wiper possible, it is advantageous that only slight changes in the usual standard components are needed. On its end toward the joint member, the fastening part of the invention has a detent path, which is expediently formed on in the course of production of the fastening part. As a modification compared with the standard component, a spring detent is secured to the joint member. The spring detent is expediently disposed in the spring chamber of the joint member, specifically laterally offset from the C-shaped bracket or from the tension spring.

Expediently, the spring detent has a spring tongue as a resilient element, which is secured with an angle element to a side cheek of the joint member. The spring tongue is disposed such that on pivoting of the wiper arm into the detent position, it touches the detent path of the wiper arm and engages a detent indentation. The shapes of the spring tongue and of the detent indentation are adapted to one another in such a way that for the wiper arm to reach the swing-down position or the operating position, it must be pressed past a limiting cam in both pivoting directions. In the operating position, the spring tongue touches the fastening part only insignificantly, if at all, so that the bearing forces of the wiper blade are practically unchanged.

BRIEF DESCRIPTION OF THE DRAWINGS

Further advantages will become apparent from the ensuing drawing description. In the drawing, exemplary embodiments of the invention are shown. The drawing, description and claims include numerous characteristics in combination. One skilled in the art will expediently consider the characteristics individually as well and put them together to make useful further combinations.

Shown are.

DETAILED DESCRIPTION OF THE PREFERRED EMBODIMENTS

Figure 1:
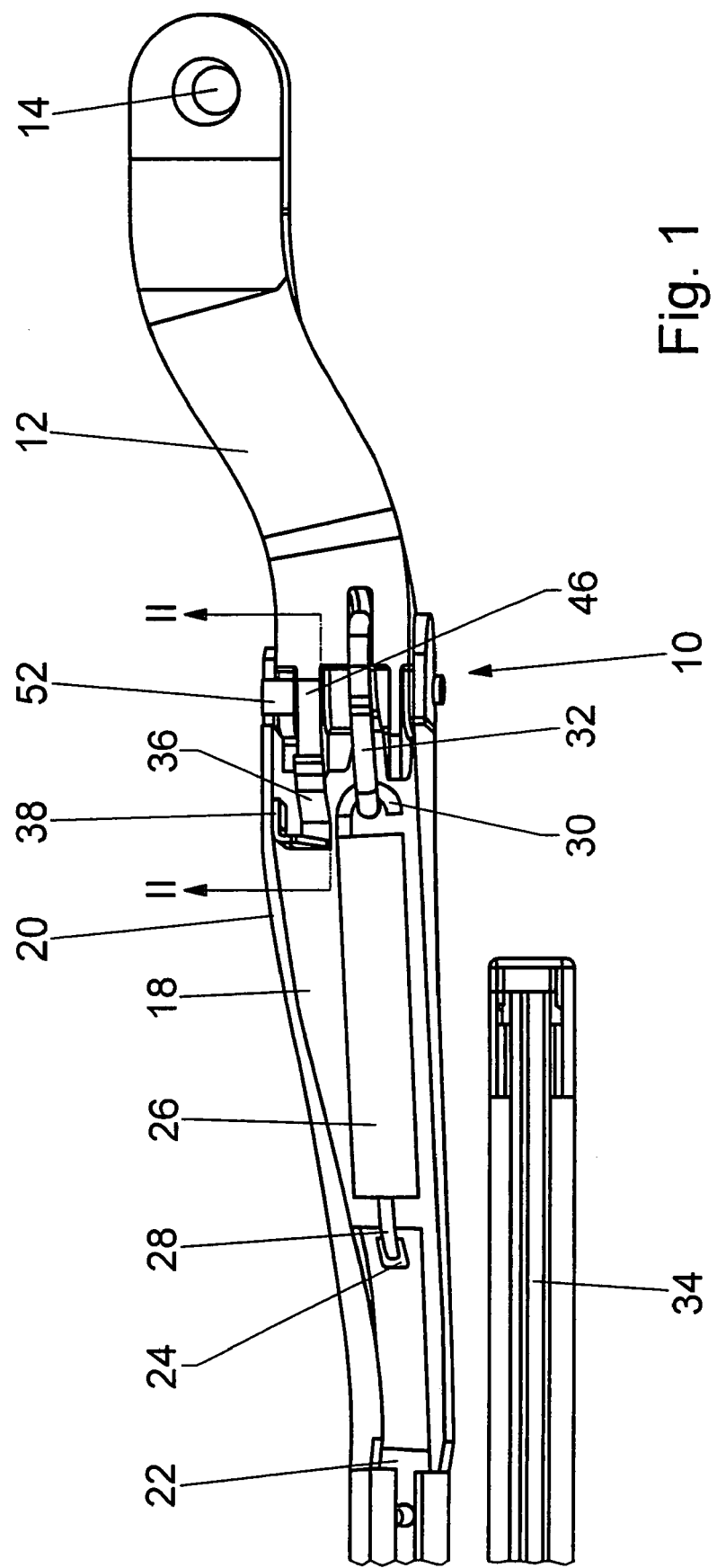
FIG. 1, a fragmentary view of a wiper arm and a wiper blade from below.
Figure 2:
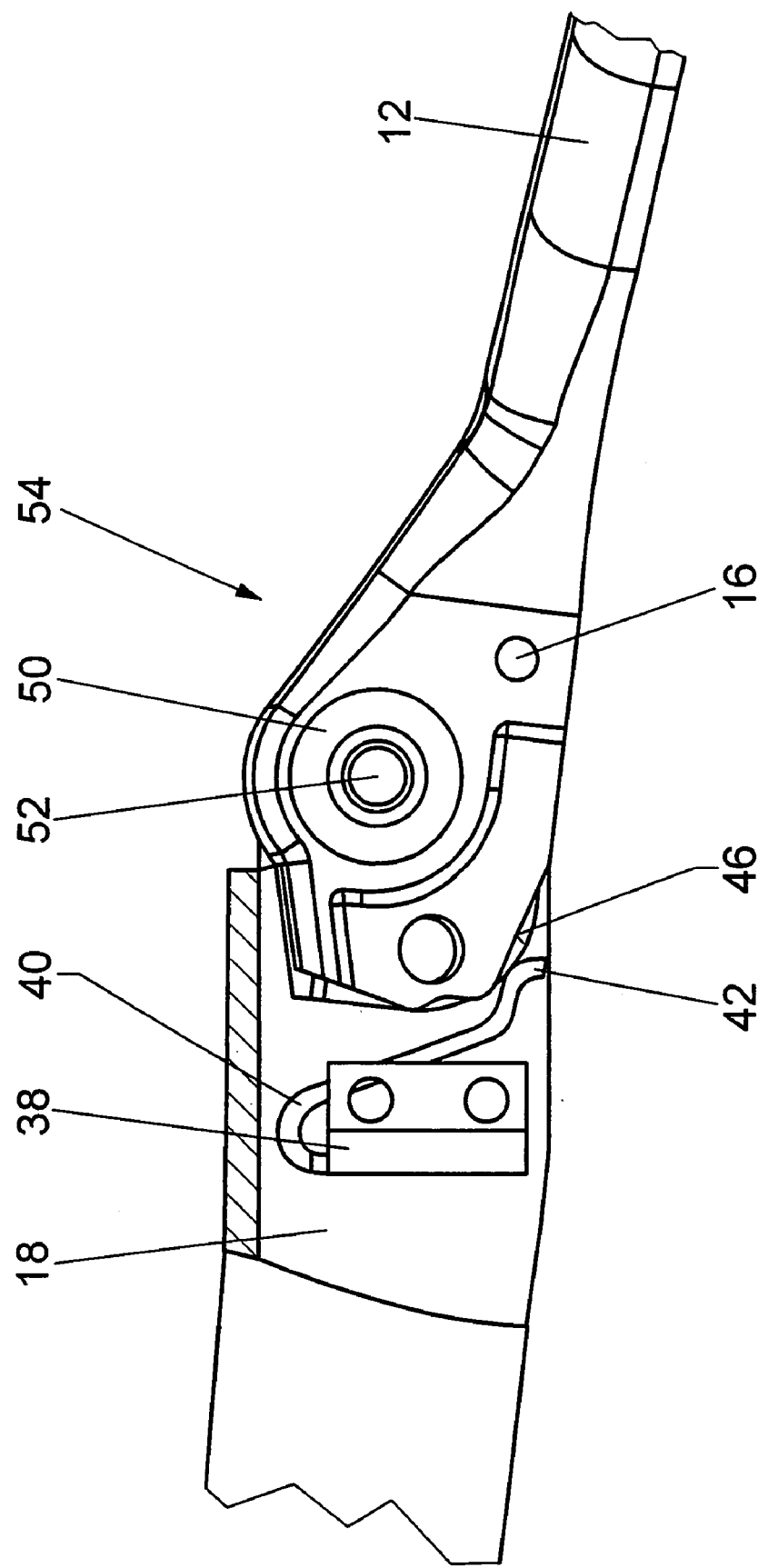
FIG. 2, a fragmentary side view of a wiper arm in an operating position, in a section taken along the line II-II in FIG. 1.

A wiper arm 10 includes a fastening part 12 and a joint member 18, with a wiper rod 22 to which a wiper blade 34 is pivotably connected (FIG. 1). On one end, the fastening part 12 has a receiving bore 14 for a drive shaft, not shown, of the windshield wiper. On its other end, the fastening part 12 is pivotably connected to the joint member 18 by a swing-down joint 54. In the operating position shown, both parts are braced against one another by a tension spring 26. To that end, the tension spring 26 is suspended by one end 28 from an angle element in the form of a suspension eye 24 on the wiper rod 22 and by its other end 30 via a C-shaped bracket 32 from an angle element in the form of a transverse pin 16 on the fastening part 12 (FIG. 2).

In the region of the swing-down joint 54, the joint member 18 has a U-shaped cross section, in the interior space of which the tension spring 26 is accommodated. Next to the tension spring 26 and the C-shaped bracket 32, there is a spring detent 36, which is formed by a spring tongue 40 and is secured with an angle element 38 to a side cheek 20 of the joint member 18. A part of the spring tongue 40 that is shaped as a detent end 42 points in the direction of a detent path 46 on the fastening part 12. In order not to affect the bearing force of the wiper blade 34 on the windshield, the spring tongue 40 is designed and built-in in such a way that in the operating position it lifts away from the detent path 46.

Figure 4:
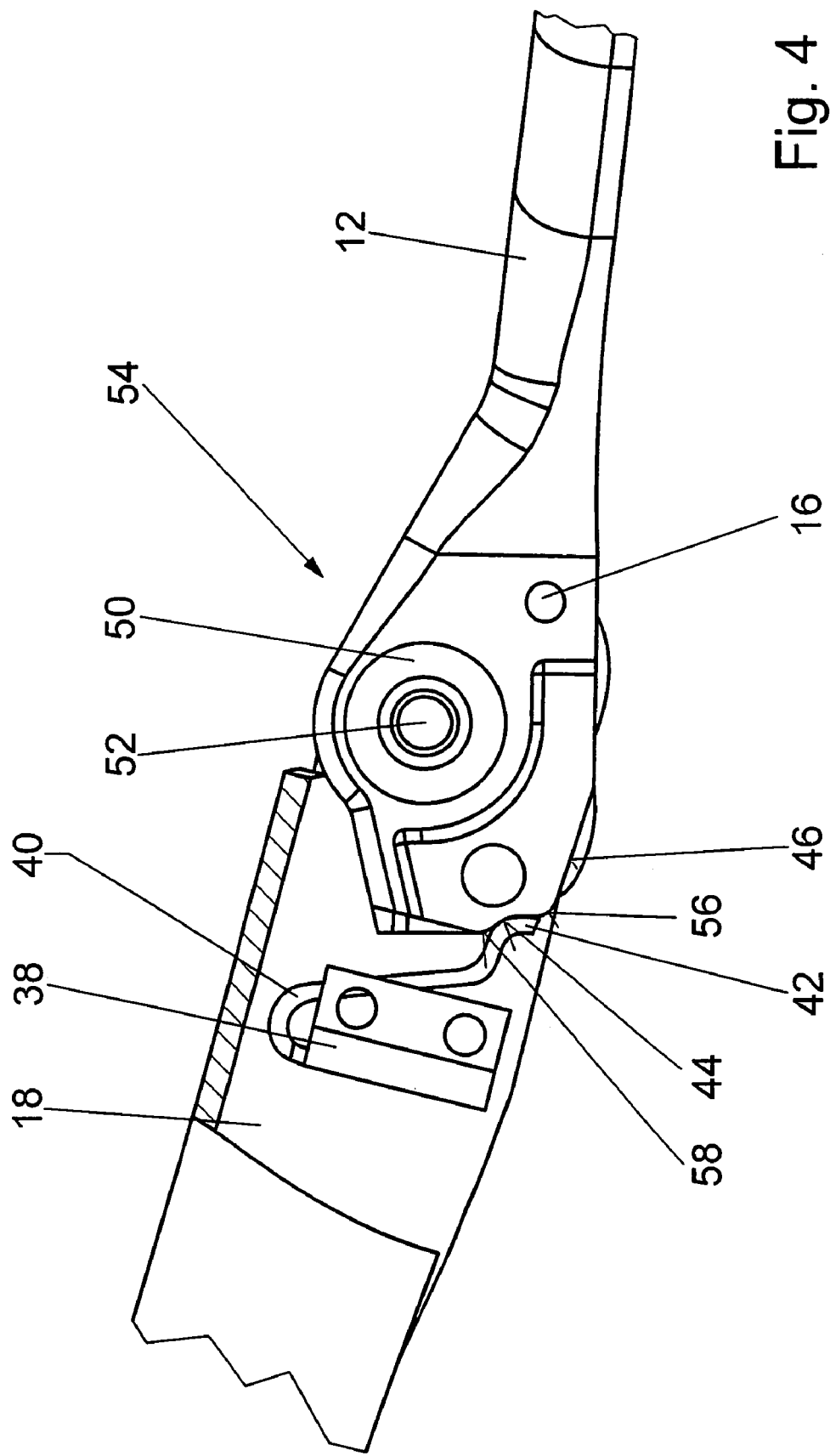
FIG. 4, a wiper arm of FIG. 2 in a detent position.

In its parking position, the wiper arm 10 is located in a so-called hood gap between the windshield and a hood, not shown, over the engine. FIG. 4 shows the swing-down joint 54 in a detent position, up to which the wiper blade 34 can be lifted away in the parking position of the windshield wiper without touching the hood. To that end, the joint member 18 is pivoted about the joint pin 52, and the detent end 42 of the spring tongue 40 slides along the detent path 46 until it snaps into a detent indentation 44.

Figure 3:
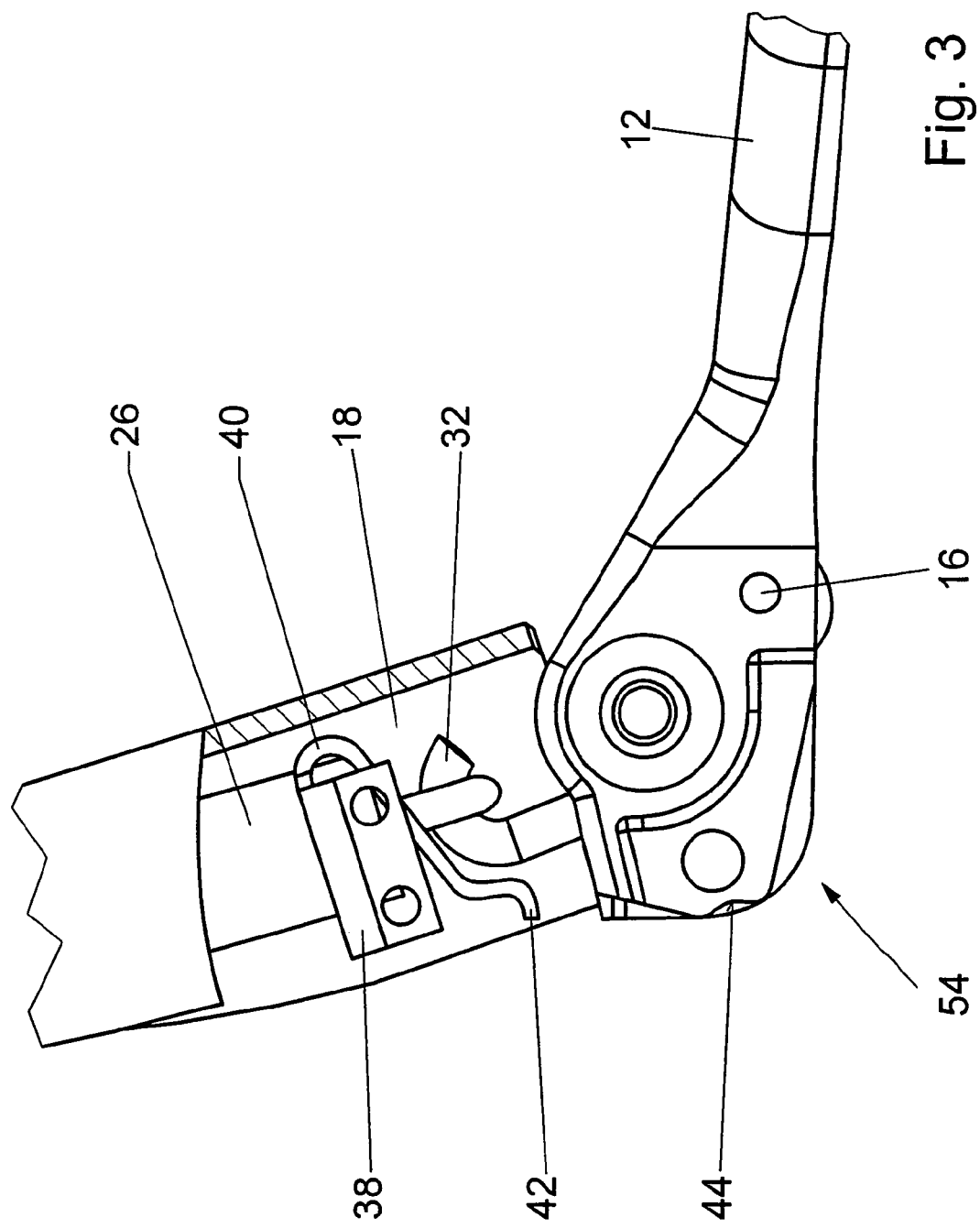
FIG. 3, a wiper arm of FIG. 2 in a swing-down position.

The detent indentation 44 is defined by two cams 56 and 58. When these two cams 56, 58 are overcome, the tension of the spring tongue 40 increases, so that the detent end 42 of the spring tongue 40 is securely held in the detent indentation 44, and the wiper arm 10 is fixed in the detent position. In this position, the joint member 18 with the wiper blade 34 is far enough away from the windshield that the wiper blade 34, for instance, and the windshield can be cleaned. For changing the wiper blade 34, the wiper arm 10 is moved out of the parking position into a position in which the joint member 18 can be swung down even farther. In the process the cam 58 is overcome, and the spring tongue 40 slides along the detent path 46 until the swing-down position is reached (FIG. 3), in which the tension spring 26 generates a force on the joint member 18 in the swing-down direction and pulls the joint member 18 or the C-shaped bracket 32 against a stop.

What is claimed is:

1. A wiper arm (10) for a windshield wiper, of a vehicle comprising: a fastening part (12) and a joint member (18) that are connected to one another via a swing-down joint (54), and a tension spring (26) is suspended by one end (28) from a suspension device (24) of the joint member (18) and by its other end (30) via a C-shaped bracket (32) in a suspension device (16) of the fastening part (12) and in an operating position presses a wiper blade (34), via a wiper rod (22), against a windshield and in a stable swing-down position presses a contact face of the joint member (18) or of the C-shaped bracket (32) against a limiting stop of the fastening part (12) to hold the joint member in said stable swing-down position, wherein between the operating position and the swing-down position, a stable detent position is provided, up to which the wiper blade (34) can be raised from the windshield in a parking position, without touching a hood over an engine of the vehicle, a detent is provided on the arm to hold the blade in said detent position.

2. The wiper arm (10) of claim 1, wherein a detent indentation (44) is disposed on the joint member (18) or on the fastening part (12), said detent is a spring detent (36) snaps into this indentation and is secured to the respectively other part (12, 18).

3. The wiper arm (10) of claim 2, wherein the spring detent (36) formed by a spring tongue (40), which is secured to the joint member (18).

4. The wiper arm (10) of claim 2, wherein the spring detent (36) is disposed laterally offset from the C-shaped bracket (32) or from the tension spring (26) and is retained by an angle element (38), which is secured to a side cheek (20) of the joint member (18).

5. The wiper arm (10) of claim 2, wherein the spring detent (36), in the operating position of the wiper arm (10), lifts away from a detent path (46).

\* \* \* \* \*